Patented Aug. 4, 1925.

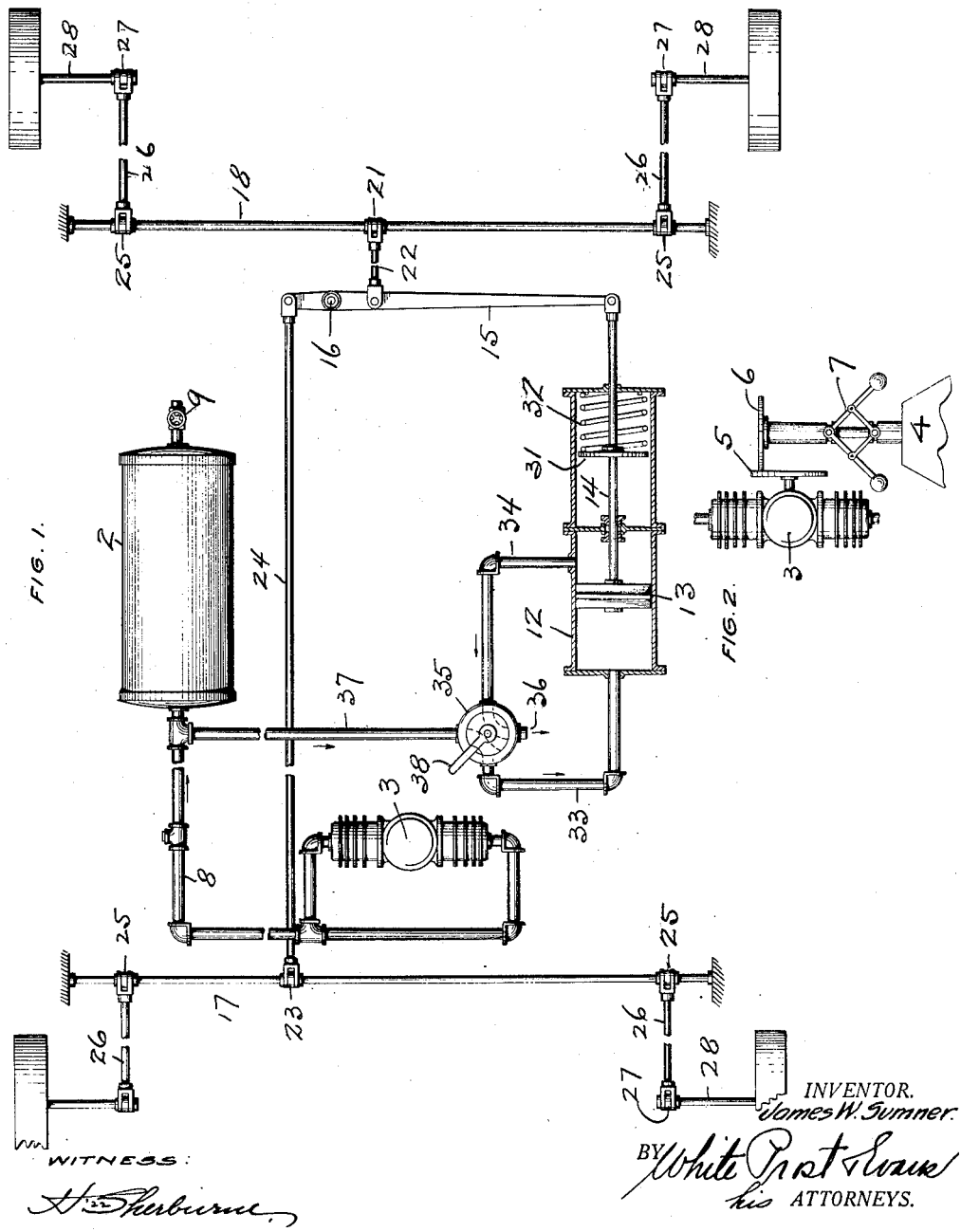

1,548,394

UNITED STATES PATENT OFFICE.

JAMES WAYNE SUMNER, OF LOS ANGELES, CALIFORNIA, ASSIGNOR TO EMORY WINSHIP, OF SAN FRANCISCO, CALIFORNIA.

VEHICLE BRAKING SYSTEM.

Application filed November 9, 1922. Serial No. 599,778.

*To all whom it may concern:*

Be it known that I, JAMES WAYNE SUMNER, a citizen of the United States, and a resident of Los Angeles, county of Los Angeles, State of California, have invented a certain new and useful Vehicle Braking System, of which the following is a specification.

The invention relates to a vehicle braking system and particularly to a braking system for automobiles and motor trucks.

An object of the invention is to provide a simple and efficient pneumatic braking system for motor vehicles.

Another object of the invention is to provide a pneumatic braking system in which the failure of the pneumatic system will result in the application of the brakes.

The invention possesses other advantageous features, some of which, with the foregoing, will be set forth at length in the following description, where I shall outline in full, that form of the invention which I have selected for illustration in the drawings accompanying and forming part of the present specification. In said drawings I have shown one form of my invention, but it is to be understood that I do not limit myself to such form, since the invention, as set forth in the claim, may be embodied in a plurality of forms.

In the accompanying drawings:

Figure 1 is a diagrammatic representation of the brake system of my invention.

Fig. 2 is a detail showing the connection between the air pump and the engine of the vehicle.

The invention comprises a braking system, wherein air under pressure is employed to hold the brakes in released position against the action of a spring, which continuously tends to apply the brakes, so that when the air pressure is released, the spring applies the brakes. There are instances where it is desirable to set the brakes very quickly, more quickly in fact, than they would be applied by the spring and this invention contemplates reinforcing the action of the spring by air under pressure acting in the same direction.

Arranged on the vehicle is a source of air under pressure, usually an air tank or receiver 2 which is supplied with air under pressure by an air pump 3 driven by the motor 4 of the vehicle. The pump is provided with a friction drive plate 5 which is engaged by the friction disc 6 driven by the motor. The disc is moved radially over the face of the plate 5, by the speed governor 7, so that the speed of the pump has slight variations due to wide variations in the speed of the motor. The pump is connected to the receiver by the conduit 8 which is provided with a check valve and the receiver is provided with an unloading valve 9.

Arranged on the vehicle is a cylinder 12 in which there is disposed a piston 13 having a piston rod 14 which is connected at its outer end to the lever 15, movement of which operates the brakes. The lever 15 is fulcrumed on the vehicle frame at 16 and is connected adjacent the fulcrum to the brake operating shaft. In the drawings I have shown two brake operating shafts 17 and 18, the former connected to brakes on the front wheels of the vehicle and the latter connected to the brakes on the rear wheels of the vehicle, but it is to be understood that the system may be applied to the rear wheels only. The brake shaft 18 is provided with a lever 21 which is connected to the lever 15 by the link 22 and the brake shaft 17 is provided with a lever 23 which is connected to the lever 15 by the link 24, the distances between the fulcrum 16 and the points of connection of the links 22 and 24 being preferably equal. Each brake shaft is provided with two levers 25 to which the brake rods 26 are connected, the brake rods being connected to levers 27 on the brake shafts 28.

Secured to the piston rod 14 is a seat 31 and interposed between the seat and a fixed abutment, which may be the opposite end of the cylinder, is a heavy coil spring 32, which presses the piston rod in a direction to apply the brakes. Connected to the cylinder, on opposite sides of the piston 13, are pipes or conduits 33—34 connected to the four-way valve 35 which has an atmosphere vent 36 and which is connected to the receiver by the pipe 37. The valve is operated by the lever 38.

When the vehicle is in normal running operation, the control valve 35 is positioned to introduce air under pressure into the cylinder on that side of the piston remote from the spring, thus compressing the spring and holding the brakes released. When it is desired to apply the brakes, the valve is turned to release the air from in front of the piston and to admit air under pressure behind the piston, causing the piston to move in a direction to apply the brakes. The degree of application is controlled by manipulation of the valve. The valve is preferably constructed so that it releases the air from in front of the piston, before it admits air behind the piston, so that the spring may be relied on to set the brakes. When this action is too slow however, the valve is turned further to admit air under pressure behind the piston. Should the supply of air under pressure become exhausted or should the pressure system fail in some other respect, the spring will move the piston to apply the brakes.

I claim:

The combination with a vehicle brake, of a piston operatively associated with said brake, movement of the piston in one direction serving to apply the brake, a spring tending to move the piston in said direction, a cylinder in which the piston is disposed, a source of ar under pressure, a fourway valve, a conduit connecting said valve with said source, conduits connecting said valve with the cylinder in front of and behind the piston and a manually operable lever on said valve operative to control the passage of air to and from the cylinder chambers so that the brakes may be applied by the spring alone or by the combined effect of the spring and air under pressure.

In testimony whereof, I have hereunto set my hand.

JAMES WAYNE SUMNER.